US008284711B2

(12) United States Patent
Michalson et al.

(10) Patent No.: US 8,284,711 B2
(45) Date of Patent: Oct. 9, 2012

(54) APPARATUS AND METHODS FOR ADDRESSABLE COMMUNICATION USING VOICE-GRADE RADIOS

(75) Inventors: William R. Michalson, Charlton, MA (US); James W. Matthews, Worcester, MA (US); Abhijit Navalekar, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 1660 days.

(21) Appl. No.: 11/476,281

(22) Filed: Jun. 27, 2006

(65) Prior Publication Data

US 2010/0238911 A1     Sep. 23, 2010

Related U.S. Application Data

(60) Provisional application No. 60/694,878, filed on Jun. 28, 2005, provisional application No. 60/717,812, filed on Sep. 15, 2005.

(51) Int. Cl.
| *H04W 92/00* | (2009.01) |
| *H04W 88/02* | (2009.01) |
| *H04W 88/06* | (2009.01) |
| *H04W 52/04* | (2009.01) |
| *H04L 12/56* | (2006.01) |
| *H04M 3/00* | (2006.01) |
| *H04M 5/00* | (2006.01) |
| *H04B 7/00* | (2006.01) |
| *H04B 1/10* | (2006.01) |
| *H04B 1/18* | (2006.01) |
| *H04B 1/16* | (2006.01) |

(52) U.S. Cl. ........ 370/319; 370/310; 370/389; 370/392; 455/422.1; 455/41.2; 455/213; 455/552.1; 455/277.1; 379/272

(58) Field of Classification Search .................. 370/338, 370/295, 310, 389, 392; 379/100.15, 100.17, 379/102.02, 272; 455/447, 462, 422.1, 432.2, 455/426.1, 74.1, 41.2, 77, 213, 277.1, 339
See application file for complete search history.

(56) References Cited

U.S. PATENT DOCUMENTS

| 4,881,241 A | | 11/1989 | Pommier et al. | |
| 5,022,046 A | | 6/1991 | Morrow, Jr. | |
| 5,444,697 A | * | 8/1995 | Leung et al. | 370/207 |
| 5,592,470 A | * | 1/1997 | Rudrapatna et al. | 370/320 |
| 5,771,224 A | * | 6/1998 | Seki et al. | 370/206 |

(Continued)

FOREIGN PATENT DOCUMENTS

EP        1395012        3/2004

(Continued)

OTHER PUBLICATIONS

Silage, Dennis. Reintroducing Amateur Radio in ECE Capstone Design Projects. Proc. 2004 Am. Soc. for Eng. Educ. Ann. Conf. (7 pages).

(Continued)

*Primary Examiner* — Asad M Nawaz
*Assistant Examiner* — Wutchung Chu
(74) *Attorney, Agent, or Firm* — Ropes & Gray LLP

(57) ABSTRACT

The invention relates to methods and apparatus for conducting directed communication using voice-grade radios. The methods and apparatus can be used to form a packet-switched wireless network using legacy analog transceivers, providing, e.g., both data and voice-over-Internet Protocol communication.

35 Claims, 9 Drawing Sheets

U.S. PATENT DOCUMENTS

| | | | |
|---|---|---|---|
| 5,796,728 A | | 8/1998 | Rondeau et al. |
| 5,815,488 A | * | 9/1998 | Williams et al. ............... 370/206 |
| 5,933,478 A | * | 8/1999 | Ozaki et al. ................ 379/93.24 |
| 5,978,386 A | | 11/1999 | Hamalainen et al. |
| 6,075,814 A | | 6/2000 | Yamano et al. |
| 6,385,190 B1 | * | 5/2002 | Malkamaki et al. .......... 370/347 |
| 6,496,490 B1 | * | 12/2002 | Andrews et al. .............. 370/329 |
| 6,658,063 B1 | | 12/2003 | Mizoguchi et al. |
| 6,731,629 B1 | | 5/2004 | Patel et al. |
| 7,095,708 B1 | * | 8/2006 | Alamouti et al. ............ 370/208 |
| 7,230,935 B2 | * | 6/2007 | Proctor et al. ................ 370/315 |
| 2002/0138807 A1 | | 9/2002 | Nguyen |
| 2003/0012293 A1 | | 1/2003 | Laurent et al. |
| 2004/0032853 A1 | * | 2/2004 | D'Amico et al. ............ 370/349 |
| 2004/0095920 A1 | | 5/2004 | Lippman et al. |
| 2005/0063479 A1 | * | 3/2005 | Propp et al. ................... 375/260 |
| 2005/0100120 A1 | | 5/2005 | Barton et al. |
| 2005/0220214 A1 | * | 10/2005 | Waltho et al. ................ 375/295 |
| 2005/0228650 A1 | * | 10/2005 | Huang ........................... 704/205 |
| 2006/0146875 A1 | * | 7/2006 | Yang ............................. 370/468 |
| 2006/0192537 A1 | * | 8/2006 | Hagen et al. ................. 323/222 |
| 2006/0227814 A1 | * | 10/2006 | Iannuzzelli et al. .......... 370/516 |
| 2006/0229029 A1 | * | 10/2006 | Waltho et al. .................... 455/73 |
| 2007/0047514 A1 | * | 3/2007 | Rayment et al. .............. 370/351 |

FOREIGN PATENT DOCUMENTS

| | | |
|---|---|---|
| JP | 2004301848 | 10/2004 |
| WO | WO-02/39710 | 5/2002 |
| WO | WO-02/078369 | 10/2002 |

OTHER PUBLICATIONS

Retrieved Dec. 2, 2005 from http://n1su.com/windrm/docs. WinDRM Docs (27 pages).

Retrieved Dec. 2, 2005 from http://drm.sourceforge.net. Dream DRM Receiver.

Retrieved Mar. 10, 2005 from http://intl.ieeexplore.ieee.org. Pan et al. Dynamic sub-channel allocation with adaptive beamforming for broadband OFDM wireless systems.

Retrieved Dec. 16, 2005 from http://www.qslnet.de. HamDream. (3 pgs).

Retrieved Dec. 16, 2005 from http://www.eham.net/forums. Posting (5 pgs).

* cited by examiner

APPARATUS AND METHODS FOR ADDRESSABLE COMMUNICATION USING VOICE-GRADE RADIOS

REFERENCE TO RELATED APPLICATIONS

This application claims priority to and the benefit of U.S. Provisional Patent Application Ser. No. 60/694,878, filed on Jun. 28, 2005 and entitled "OFDM-Based VHF/UHF Modem," and U.S. Provisional Patent Application Ser. No. 60/717,812, filed on Sep. 15, 2005 and entitled "VHF/UHF OFDM Modem," the entire contents of both of which are incorporated herein by reference.

GOVERNMENT CONTRACT

The U.S. Government has a paid-up license in this invention and the right in limited circumstances to require the patent owner to license others on reasonable terms as provided for by the terms of Contract No. DAMD17-03-2-0006 awarded by U.S. Army Medical Research and Materiel Command (USAMRMC).

BACKGROUND OF THE INVENTION

The Department of Homeland Security, the military, as well as local fire and police departments have been looking for technology to allow their wireless communication systems to interoperate and more effectively cooperate in response to emergency situations. Particularly at the local municipal level, wireless communication systems currently in use rely mainly on voice grade radios transmitting in the VHF and UHF bands of the electromagnetic spectrum. While some digital voice-grade radios have become available, a large majority of voice-grade radios in use still rely on legacy analog communications.

A need exists in the art for a means for users of standard VHF and UHF analog voice-grade radios to communicate both voice and data using those radios. In particular, there is a need for the ability for addressable communications to and from such voice-grade radios

SUMMARY OF THE INVENTION

In one aspect, the invention relates to a method for transmitting voice or other data to a specified destination using a standard VHF or UHF transceiver. The methodology described herein can also be used for transmitting voice or data at other frequencies. The method includes obtaining data for transmission, and converting the data into packets, conforming for example, to the Internet Protocol. The packets include at least destination address. In one embodiment, the data converted into packets are obtained from an analog source, such as a microphone. In another embodiment the data are obtained from an external computing device.

The packets are encoded, for example, using a quadrature amplitude modulation process, in a plurality of orthogonal frequency division multiplexed (OFDM) tones. The tones have frequencies ranging from about 300 Hz to about 3,000 Hz. The encoded tones are frequency modulated on a carrier frequency and are transmitted as an RF signal, for example, by a VHF or UHF radio. In one embodiment, the packets carry voice data using, for example, a voice over Internet Protocol.

In another aspect, the invention relates to methods for receiving voice or other data addressed specifically to a standard voice-grade radio. In one embodiment, the method includes receiving a plurality of frequency modulated OFDM tones on a carrier VHF or UHF frequency. The modulated tones have frequencies ranging from about 300 Hz to about 3,000 Hz. The tones are demodulated and decoded to recover packets of data. An address is extracted from the data packet to determine if the communication device decoding the packet is in fact the intended recipient of the packet. If the decoding communication device is not the intended recipient, it discards the packet. If the packet is intended for the recipient, the communication device outputs the data included in the packet. In one embodiment, the communication device converts the packet into an audio signal and outputs the audio via a speaker. In another embodiment, the communication device forwards the packet, or the data in the packet, to an attached computing device.

In another aspect, the invention relates to methods for using standard voice grade radios to form a wireless local area network (WLAN). In addition to the sending and receiving methodologies described above, in one embodiment the invention includes a routing feature for routing packets among radios within the WLAN and to and from other communication devices outside of the WLAN. For example, in one implementation of the routing functionality, after decoding a packet and extracting an address, the method includes determining a next-hop node for the packet and forwarding the packet to the next-hop node. The next-hop node may be another voice grade radio, or it may be a computer or other communication device linked to the router via a wired or other wireless link. Thus, the communication device may re-encode the packet into OFDM tones and transmit the re-encoded packet on the original carrier frequency or on a second carrier frequency. Alternatively, the communication device can forward the packet over the wired or other wireless link, such as an 802.11 compliant link.

In another aspect, the invention relates to a communication device. For example, the communication device can be a speaker/microphone unit capable of being connected to a standard voice-grade VHF radio. The communication device includes a housing which holds a processor configured for carrying out the methods described above. The processor, in one implementation includes a digital signal processor and a separate network interface.

The housing also includes a data input, such as a digital data port or a microphone connected to the processor. The digital data port can also be used to output received data via a wired link to another computing device, such as a router, laptop, or desktop computer. The processor also provides, in one implementation, a vocoding functionality for encoding speech received via a microphone into digital data, and decoding speech received via the voice-grade radio.

The housing also includes a radio interface for connecting the communication device to the radio. For example the radio interface includes a jack for connecting the communication device to the input/output port of a standard VHF or UHF voice-grade radio. In another embodiment, the housing incorporates a speaker for outputting received audio data. In another embodiment, the communication device includes a user interface for accepting a destination address for data. For example, the communication device includes, in one implementation a keyboard and display.

In another aspect, the invention relates to a communication device including a radio and a data encoding and decoding processor. The two can be combined in a single housing, or they can be separated into distinct housings connected by a wire, e.g., an RS-232 cable. The radio of the communication device has an input for accepting signal components of incoming analog signals having frequency components ranging between about 300 Hz and about 3,000 Hz.

BRIEF DESCRIPTION OF THE DRAWINGS

The invention may be better understood from the following illustrative description with reference to the following drawings.

DETAILED DESCRIPTION OF CERTAIN ILLUSTRATIVE EMBODIMENTS

To provide an overall understanding of the invention, certain illustrative embodiments will now be described, including apparatus, methods, and networks suitable for IP based communication using voice-grade VHF radios. However, it will be understood by one of ordinary skill in the art that the apparatus, methods, and network described herein may be adapted and modified as is appropriate for the application being addressed and that the systems and methods described herein may be employed in other suitable applications, and that such other additions and modifications will not depart from the scope hereof.

Figure 1:
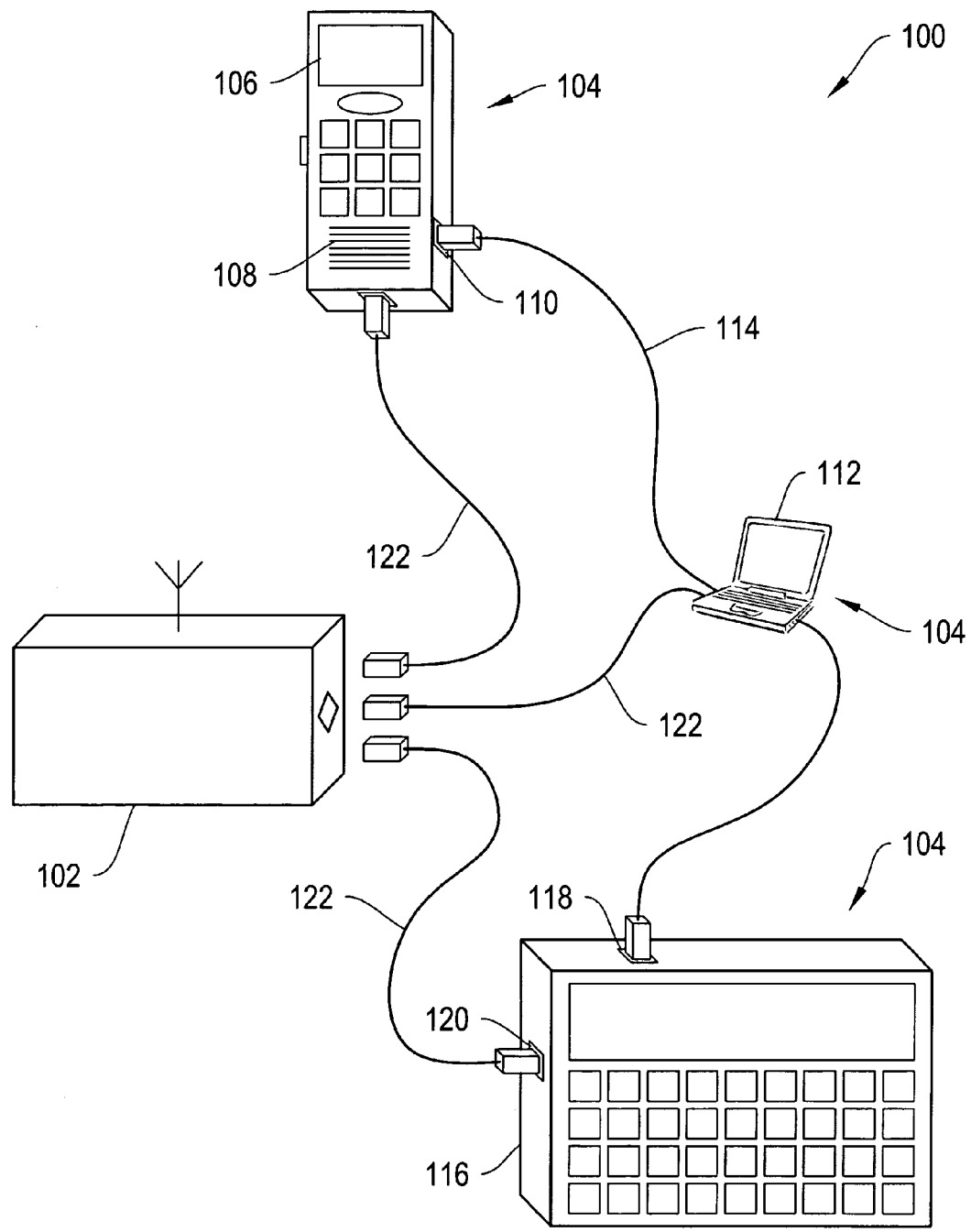
FIG. 1 is a diagrammatic view of a system for wireless voice and data communication at VHF frequencies, according to an illustrative embodiment of the invention.

FIG. 1 is a diagrammatic view of a system 100 for wireless voice and data communication at VHF frequencies, according to an illustrative embodiments of the invention.

The system 100 includes a radio transceiver 102 and a data transcoder 104. In general, the data transcoder 104, described further in relation to FIG. 3, receives data to be transmitted wirelessly, encodes the data in addressed data packets as symbols in OFDM tones ranging from about 300 Hz to about 3,000 Hz, and outputs the encoded tones to the transceiver 102 for transmission at VHF frequencies. The transceiver will be described in further detail in relation to FIG. 2.

In one implementation, the transcoder 104 is built into a microphone/speaker device 106. The microphone/speaker device 106 can accept audio data directly via a microphone 108. It can also include a digital data port 110 for receiving data from another computing device 112, such as a laptop, via wired link 114. The form of the wired link 114 depends on the specific form of the digital data port and the particular communication ports of the computing device 112. The wired link 114 can be, for example and without limitation, an Ethernet cable, an RS-232 cable, a USB cable, a firewire cable, a coaxial cable, or a fiber optic cable.

In another implementation, the transcoder 104 is built into the computing device 112, itself, either in hardware or software. In a further implementation, the transcoder 104 is a standalone device 116, accepting data for transmission via a data input 118 and outputting the data to the transceiver 102 via a radio interface 120. In still another implementation, the transcoder 104 is built into the transceiver 102, itself. In the implementations in which the transcoder 104 is not built directly into the transceiver, it connects to the transceiver over a RS-232 cable 122.

Figure 2:
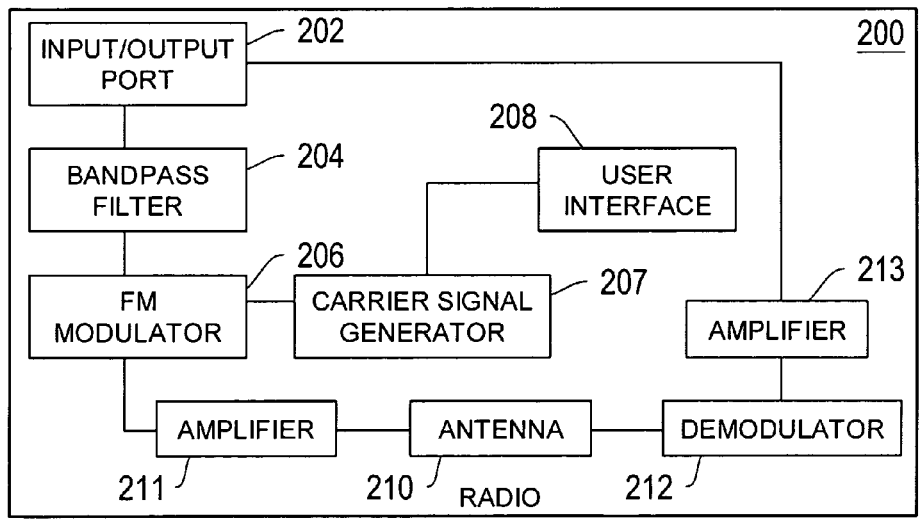
FIG. 2 is a block diagram of a transceiver of FIG. 1, according to an illustrative embodiment of the invention.

FIG. 2 is a block diagram of the transceiver 200 suitable for use with an illustrative embodiment of the invention. The transceiver can be any radio transceiver known in the art capable of VHF, UHF or other frequency transmission and having an input/output port 202, including, for example, radios in the Motorola XTS 5000™ series, provided by Motorola, Inc., headquartered in Schaumburg, Ill., operating in their analog mode, or the IC-T2H radio provided by Icom America, of Bellevue, Wash. Preferably, the transceivers communicate in the VHF or UHF frequency ranges. Typical VHF transceivers used for voice communications known in the art include a voice input/output port 202 for accepting signals from a microphone and outputting received signals to a speaker. The transceivers 200 typically include a bandpass filter 204 to exclude components of signals received via the input/out port 202 with frequencies outside of the frequency range of typical human speech, i.e., between about 300 Hz and about 3,000 Hz. The transceiver 200 includes a FM modulator 206 for frequency modulating the received signal on a carrier frequency generated by a carrier signal generator 207, such as an oscillator. A user input 208 allows a user to change the carrier frequency. Modulated signals are passed through an amplifier 211 and are transmitted via an antenna 210. The antenna 210 also receives FM modulated signals. A demodulator 212 demodulates received FM signals to recover encoded OFDM tones. The demodulated signals are amplified by a second amplifier 213 and are output via the input/output port 202.

Figure 3:
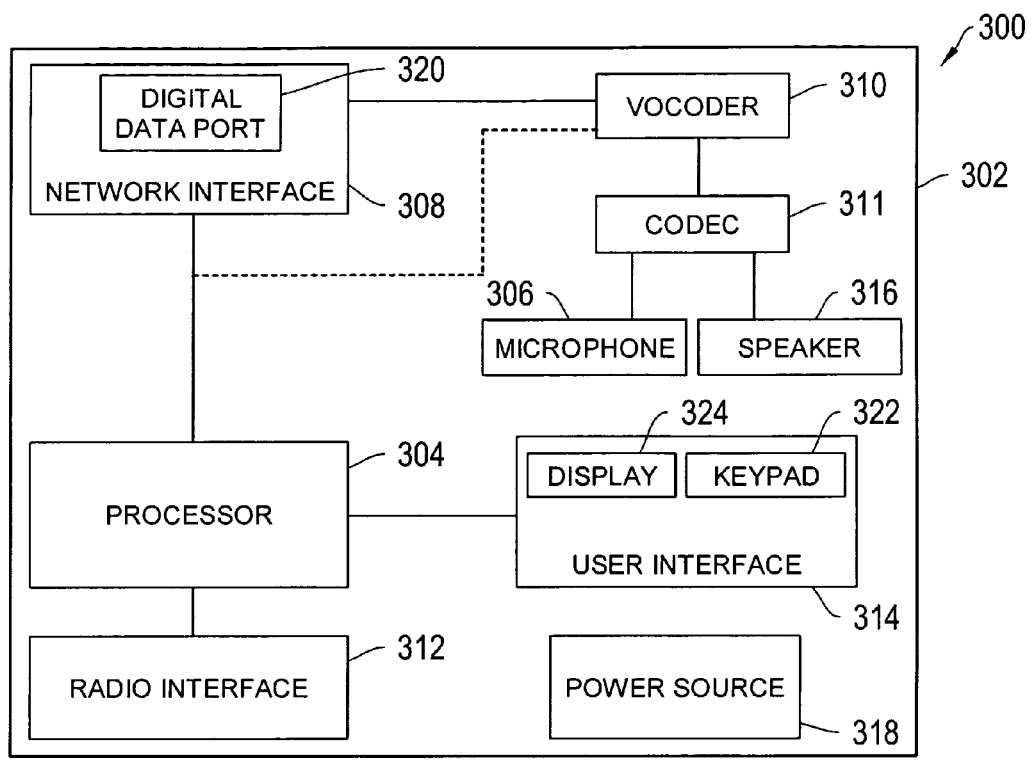
FIG. 3 is a block diagram of a transcoder, suitable for use in the system of FIG. 1, according to an illustrative embodiment of the invention.

FIG. 3 is a block diagram of a transcoder 300, according to an illustrative embodiment of the invention. As mentioned above, a transcoder 104 can be incorporated into a transceiver (such as transceiver 102 or 200), it can be incorporated into a computing device, it can be incorporated into a speaker/microphone unit, or it can be built as a standalone device. The transcoder 300 of FIG. 3 corresponds to an illustrative speaker/microphone implementation. The transcoder 300 includes, in a housing 302, a processor 304, a microphone 306, a network interface 308, a vocoder 310, a codec 311, a radio interface 312, a user interface 314, a speaker 316, and a power source 318 (e.g., one or more batteries, an AC adapter, or a DC adapter for use with an automobile 12 V power outlet).

The housing 302 holds the processor 304. The processor 304 is responsible for converting data to be transmitted into a format suitable for transmission by the transceiver. To do so, the processor 304 converts data into OFDM symbols and generates an analog signal including the symbols. The processor 304 then forwards the analog signal to the radio interface 312. The processor 304 is also responsible for converting data received from the transceiver into digital data packets. Decoded data packets are forwarded to the network interface 308 for processing. In alternative implementations, the processor incorporates vocoding and user interface functionality, too.

The processor 304, in one implementation, is a digital signal processor. The digital signal processor can be specifically designed for the transcoder application, or it can be implemented using an off-the-shelf DSP development board, such as the 56307 EVM, available from Freescale Semiconductor, Inc. (formerly Motorola Semiconductor), headquartered in Austin, Tex. In alternative implementations, the processor 304 also includes a general purpose central processing unit, another digital signal processor, or an application specific integrated circuit for controlling the user interface 314 and the vocoder 310. The processor 304 may also include analog-to-digital and digital-to-analog converters for communicating with the radio interface 312.

The network interface 308 in the transcoder 300 provides for the receipt, handling, and output of digital data for the transcoder 300. More particularly, the network interface 308 handles digital data communications between the transceiver and an attached computing device, such as computing device 112. The network interface 308 forwards packets received from the attached computing device to the processor 304 for encoding and output to the transceiver. It also forwards packets addressed to the computing device received from the transceiver to the computing device. The network interface 308 also mediates the communication of digital data to and from the vocoder 310. The network interface 308 forwards encoded speech data received from the vocoder 310 to the processor 304 for further encoding and output to the transceiver. It forwards data addressed to the speaker 316 to the vocoder 310 for decoding into an analog speech signal.

The network interface 308 includes a digital data port 320 incorporated into the housing 302 for connecting the transcoder 300 to an external computing device via a cable. In one implementation, the digital data port 320 is an RJ-45 jack for accepting a standard Ethernet cable. In other implementations, the digital data port 320 can be a firewire, USB, fiber optic, or coaxial cable jack. In other implementations, the network interface 308 can include multiple digital data ports 320 for accepting data over multiple types of connections.

The specific selection of the network interface 308 depends on the digital data port 320 desired to be incorporated into the housing 302. For example, in implementations incorporating an RJ-45 jack, the NETBURNER™ SB72 network card, provided by Netburner, Inc., of San Diego, Calif., serves as a suitable network interface 308. The NetBurner SB72 implements the Ethernet protocol and is capable of extracting data from IP packets and for generating IP packets from physical layer data. The network interface also is responsible for selectively forwarding data in received packets to the vocoder or the attached computing device, based on the address included in the header of the received packet.

In an alternative implementation, the transcoder 300 uses a single address for communications to and from the vocoder 310 and attached computing device. To address and route messages appropriately in such implementations, a bit in each packet is set to distinguish between data communicated to or from the vocoder 310 and data communicated to and from the attached computing device.

The vocoder 310 digitally encodes speech received via the microphone 306 and decodes encoded speech into analog signals for driving the speaker 316. The vocoder 310 can be implemented as a separate processor, e.g., a digital signal processor implementing vocoding software, or it can be incorporated into the processor 304. One particular vocoder suitable for inclusion in the transcoder 300 is the AMBE 2000/2020 vocoder, available from Digital Voice Systems, Inc., located in Westford Mass. The vocoder 310 outputs encoded speech to the network interface 308 to be broken into voice-over IP packets. The vocoder 310 outputs decoded speech to the speaker 316 via the codec 311. The codec 311 converts the digital output of the vocoder into an analog signal. The codec 311 similarly converts the audio received via the microphone 306 into a digital signal suitable for processing by the vocoder 310. The Texas Instruments TLV320AIC12K is an example of a suitable codec circuit.

The processor 304 outputs encoded analog signals to, and receives encoded analog signals received by the transceiver from, the radio interface 312. The radio interface 312 includes a jack for connecting the transcoder 300 to the transceiver. In the illustrative implementation, the radio interface 312 includes an RJ-45 jack for accepting a speaker/microphone cable.

The transcoder 300 also includes a microphone 306 incorporated into the housing 302. A button incorporated into a side of the housing 302, a PTT button, selectively activates the transmission functionality of the transceiver 200. Alternatively, the transmission functionality can be controlled by the processor 304. The microphone 306 is electrically connected to the vocoder 310 via the codec 311.

A user interface 312 is also incorporated into the housing 302. The user interface 312 includes a keypad 322 and a display 324. Users of the transcoder 300 can use the keypad 322 to enter in a destination address for outgoing messages. The entered address can be an IP address, a Uniform Resource Locator, or any other address conforming to an addressing scheme known in the art for identifying intended recipients of data. The user interface 312 can also be used to access other features that may be provided for users, including an encryption or other data coding processes, the push-to-talk button described above for controlling the microphone 306, and a volume control.

Figure 4:
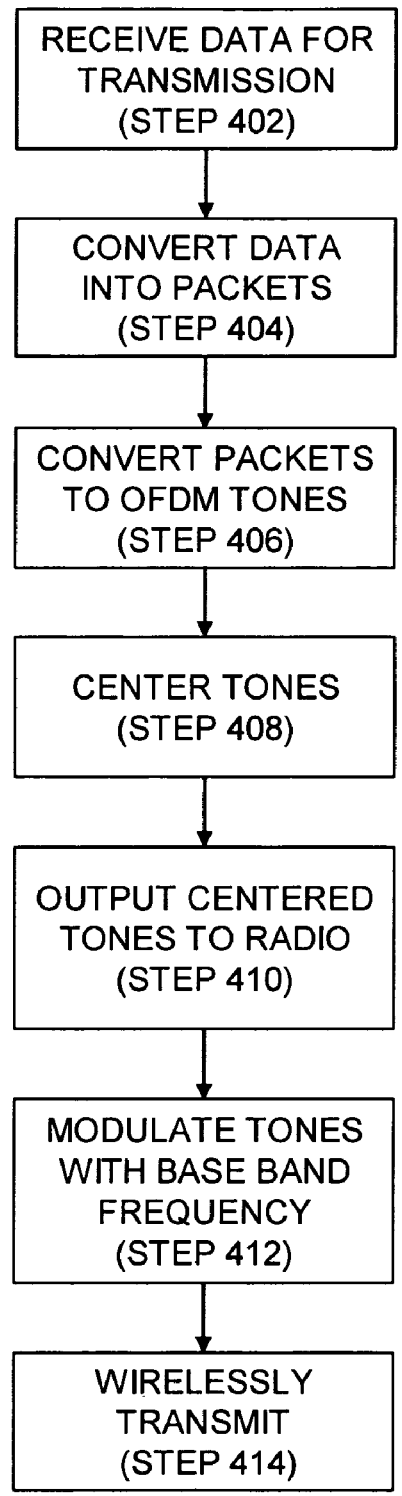
FIG. 4 is a flowchart of a method of transmitting data or voice using the system of FIG. 1, according to an illustrative embodiment of the invention.

FIG. 4 is flowchart of a method 400 for transmitting data using a transcoder, such as transcoder 300, and a VHF transceiver, such as transceiver 200, according to an illustrative embodiment of the invention. The method begins with the network interface 308 of the transcoder 300 receiving data for transmission (step 402). The data can be received via the vocoder 310 or from the digital data port 320. The received data is broken into data packets (step 404). In one implementation, the data is first split into Mac-Layer Protocol Data Units ("MPDUs"), each of which includes its own header, body, and trailer. The header of the MPDU includes an address, for example, an IP address or a MAC address, of one or more intended recipients. The address can be a unicast, multicast, or broadcast address. In one implementation, the MPDUs conform to the Internet Protocol, e.g., either IP v.4 or IP v.6. The MPDUs are then encapsulated in a Physical Layer-Protocol Data Unit ("PPDU"). Each PPDU includes its own header, a body including one or more MPDUS, and a trailer. The MPDU and/or the PPDU includes a time-to-live data field in its header.

After the data is broken in packets (step 304), e.g., PPDUs, the processor 304 of the transcoder 300 converts the packets into OFDM tones (step 406). The tones are selected in the frequency range of about 300 Hz to about 3,000 Hz, corresponding to the frequency range accepted by voice inputs of typical VHF radios. In one implementation, the data is modulated on 64 tones, separated by 31.25 Hz. Methods for carrying out this type of modulation are known in the art, and are described, for example, in "OFDM for Data Communication Over Mobile Radio FM Channels—Part I: Analysis and Experimental Results" by Eduardo Casas, published in IEEE Transactions in Communications, Vol. 39, No. 5, May 1999, the entirety of which is incorporated by reference. Software code for carrying out such a transformation was available in an open-source software program known as HAMDream. Data can be encoded in OFDM tones (step 406) with a variety of modulation techniques, including, without limitation, Binary Phase Shift Keying (BPSK), Quadrature Phase Shift Keying (QPSK), 16 symbol Quadrature Amplitude Modulation (16 QAM), and 64 symbol Quadrature Amplitude Modulation (64 QAM).

The OFDM tones are then frequency shifted to be centered about the center of the audio passband of the filter in the transceiver 200 (step 408). In one implementation, this is accomplished by modulating the real (in-phase) and imaginary (quadrature-phase) components of the OFDM signal by a 1.650 Khz center frequency. The real and imaginary components of the OFDM symbols are then passed through an interpolation filter and mixed to the desired frequency. The resulting signal is then output via the radio interface 312 to the transceiver 200 (step 410). The transceiver 200 frequency modulates the signal on its carrier transmission frequency (step 412) and transmits the frequency modulated signal (step 414).

In one implementation, data packets are normally transmitted at 14.4 Kbps using the TCP/IP protocol and 64-QAM OFDM. In addition, an algorithm similar to the one in the 802.11 standard is used to monitor the signal to noise ratio of transmissions and back off the transmission rate as the signal-to-noise ratio deteriorates: first to 9600 bps with 16-QAM and, if necessary, to 4800 bps with 4-QAM.

Figure 5:
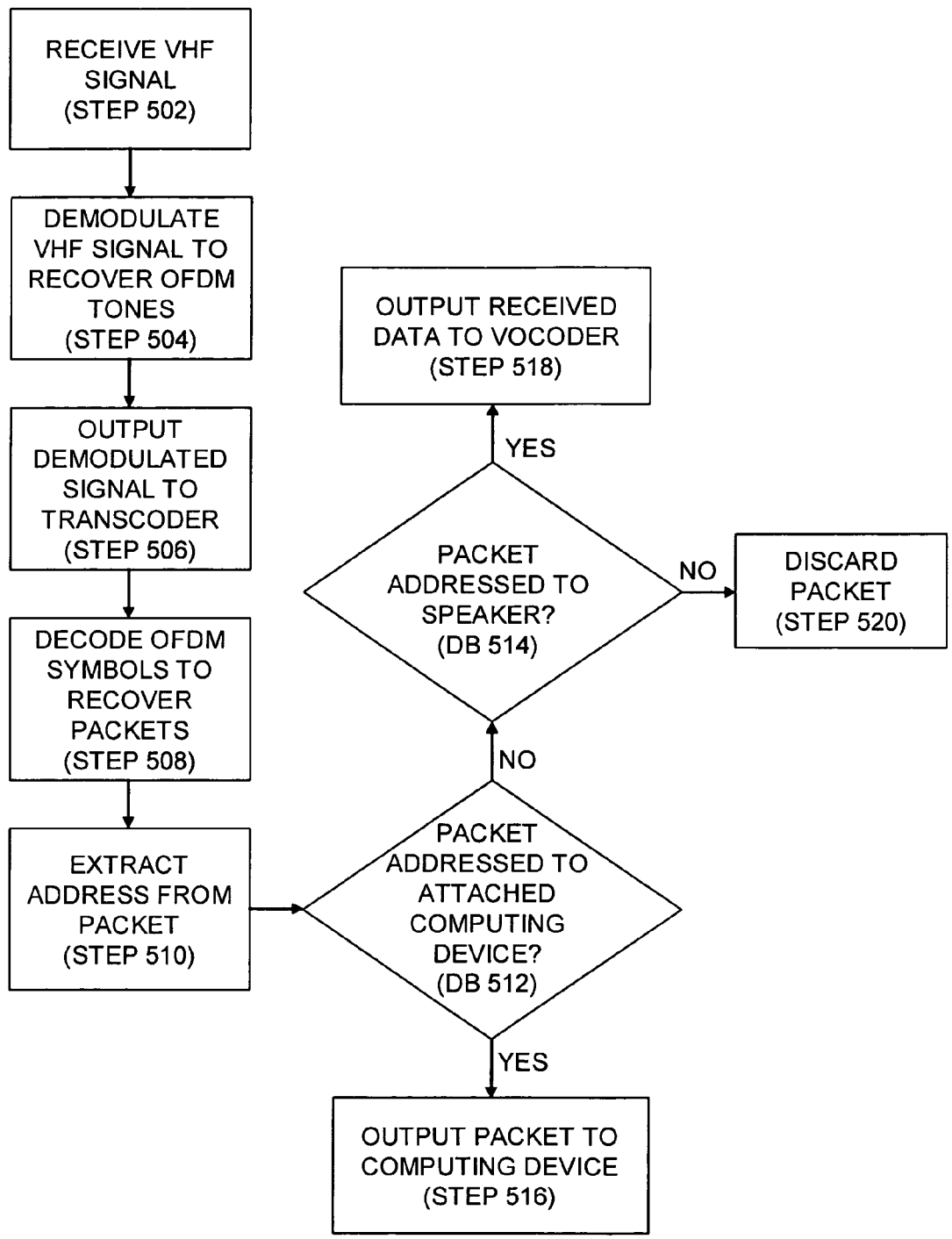
FIG. 5 is a flowchart of a method of receiving data or voice using the system of FIG. 1, according to an illustrative embodiment of the invention.

FIG. 5 is flow chart of a method 500 for a communication device including a transcoder, such as transcoder 300 and a transceiver, such as transceiver 200, to handle data received from the transceiver 200, according to an illustrative embodiment of the invention. The method 500 begins with the transceiver 200 receiving an analog signal on its carrier VHF frequency (step 502). The transceiver 200 demodulates the analog signal (step 504) and outputs the demodulated signal to the transcoder 300 via input/output port 202 for further processing (step 506). The transcoder 300 receives the demodulated signal via the radio interface 312 where it is forwarded to the processor 304. The processor 304 decodes the OFDM symbols encoded in the signal and stores the results in data packets (step 508). The processor 304 outputs the data packets to the network interface 308. The network interface 308 then extracts the intended address from the packet (step 510) to determine whether the packet was intended to be sent to that communication device at decision blocks 512 and 514.

The network interface 308 stores one or more IP or MAC addresses corresponding to the communication device into which it is incorporated. For example, the network interface 308 may store one IP or MAC address for an external computing device, such as computing device 112, and one IP or MAC address for the speaker 316.

If the address extracted from the received data packet corresponds to the computing device 112 (decision block 512), the network interface 308 forwards the data packet to the computing device 112 via the digital data port 320 (step 516). If the address extracted from the received data packet corresponds to the speaker 316 (decision block 514), the network interface 308 forwards the data stored in the packet to the vocoder 310 (step 518) for decoding and output via the speaker 316. If the address extracted from the received data packet does not correspond to any of the addresses that the network interface 308 stores corresponding to the communication device, the network interface 308 discards the packet (step 520).

Figure 6:
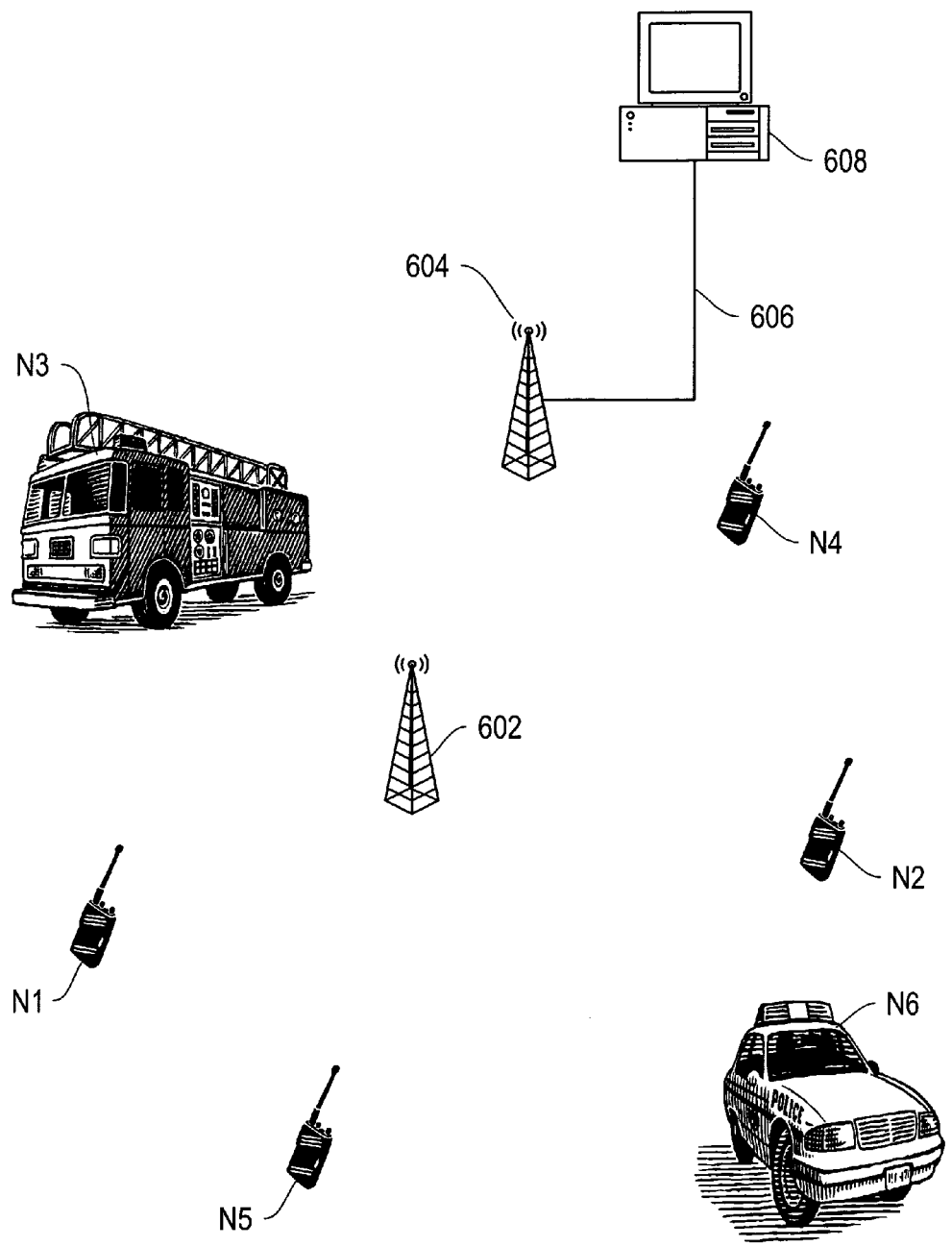
FIG. 6 is a diagrammatic view of a network utility communications system such as those described in FIG. 1, according to an illustrative embodiment of the invention.

FIG. 6 is a diagrammatic view 600 of two illustrative networks in which the communication systems, such as communication system 100, described above can be utilized for communication. The networks serve as a wireless local area networks (WLANs) over which the transceivers can communicate. The first network includes three communication devices (nodes N1, N2, and N3) operated by a first organization, e.g., a fire department. Nodes N1, N2, and N3 communicate among one another at a first frequency f1. The second network includes three additional communications devices (N4, N5, and N6) from a second organization, e.g., the police department, and communicate using a second frequency f2. The six communication devices N1-N6 each include a transcoder, such as transcoder 300, connected to a transceiver, such as transceiver 200, also referred to a transceiver/transcoder pair. The six communication devices N1-N6 are located in the same general geographic area, e.g., an area surrounding the scene of an emergency to which the organizations are responding. The communication devices N1-N6 may be, but do not need to be, mobile. For example, the communications devices can be installed in a vehicle e.g., communication devices N3 and N6, such as a police car or fire truck, or they may be hand-portable, e.g., communication devices N1, N2, N4, and N5.

Each network also optionally includes a repeater 602 and a router 604, described further below in relation to FIGS. 7 through 10, respectively. In general a repeater 602 operates on the frequency of the network in which it is included. The repeater 602 receives and rebroadcasts packets intended for communication devices on its network (e.g., communication devices N1-N3, or communication devices N4-N6), thereby extending the distance over which the communication devices on the network can communicate. The router 604, in addition to retransmitting packets addressed to communication devices on its native network, may also forward packets addressed to communication devices communicating on different networks. For example, the router 604 forwards data to communication devices operating at different frequencies (e.g., communication device N1 to communication device N4) or using different modes of communication. A router 604 can forward a packet received over the wired Internet 606 to a communication device N1-N6 or forward a packet from one of the communication devices N1-N6 operating at a first frequency to a communication device operating at a second frequency or to node 608 connected to the wired Internet. In alternative implementations, a single communication device N1-N6 can provide a combination of communication, repeating, and/or routing functionalities.

Figure 7:
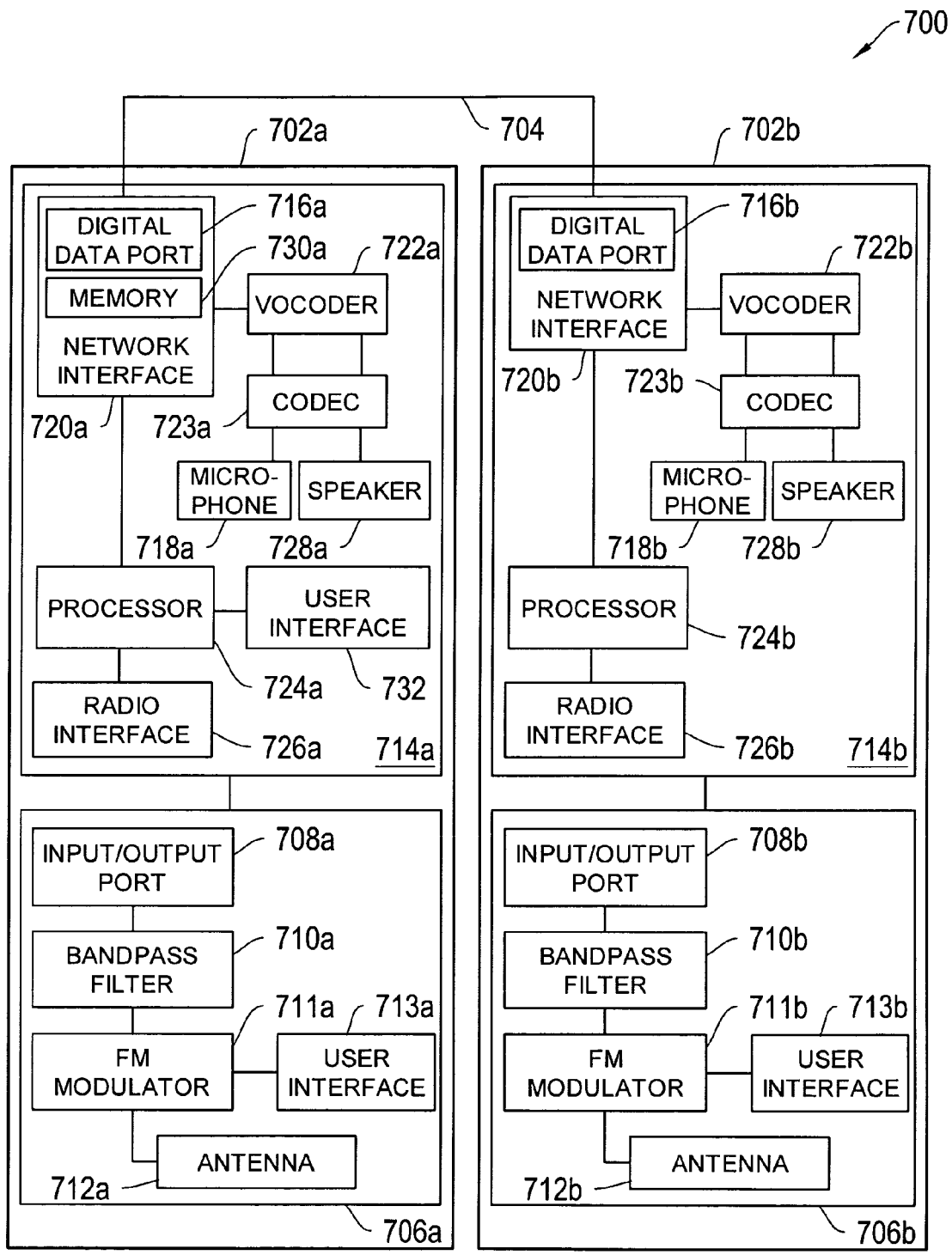
FIG. 7 is a block diagram of a repeater for use the in the network of FIG. 6, according to an illustrative embodiment of the invention.

FIG. 7 is a block diagram of a repeater 700 according to an illustrative embodiment of the invention. The repeater 700 is formed from two transceiver/transcoder pairs 702a and 702b, operating on the same carrier frequency, and which are connected by a wired connection 704, for example, by an Ethernet cable.

In one implementation, the transceiver/transcoder pairs are implemented in the same fashion as those described in relation to FIGS. 2 and 3, with one transceiver/transcoder pair 702a set for receiving transmissions and the other pair 702b set for transmitting. Each transceiver 706a and 706b in the repeater includes an input/output port 708a and 708b, a bandpass filter 710a and 710b to exclude components of signals received via the input/output port 708a and 708b with frequencies outside of the frequency range of typical human speech, i.e., between about 300 Hz and about 3,000 Hz, an adjustable FM modulator 711a and 711b for frequency modulating signals received via the input/output port 708a and 708b on a carrier frequency, an antenna 712a and 712b, and a user input 713a and 713b to allow a user to change the carrier frequency.

Each transcoder 714a and 714b includes a includes a digital data port 716a and 716b, a microphone 718a and 718b, a network interface 720a and 720b, a vocoder 722a and 722b, a coded 723a and 723b, a processor 724a and 724b, a radio interface 726a and 726b, and a speaker 728a and 728b. The network interface 720a in the receiving transcoder 714a may store IP or MAC addresses in an associated memory 730a. The stored addresses correspond to the IP or MAC addresses of the communication devices operating on the network on which the repeater is transmitting. The addresses stored in the memory 730a can be updated via a user interface 732 incorporated into the receiving transcoder 714a. Alternatively, the network interface 720a may execute software for maintaining the address list based on the source addresses included in received data packets.

In alternative implementations, the memory 730a is used for two additional optional features. In one feature, the memory 730a enables a store and forward packet forwarding system in which received packets can be cached until they are forwarded to from transcoder 714a to transcoder 714b. In the second feature, the memory 730a also serves as an archive and stores copies of all packets that pass through the transcoder 714a. The archive functionality is particularly useful for emergency response organizations. By storing all traffic sent and received by the transceiver 714a, the memory 730a can function much as a black box functions on an airplane, allowing for reconstruction of a particular response based on the communications responders conveyed to one another.

Figure 8:
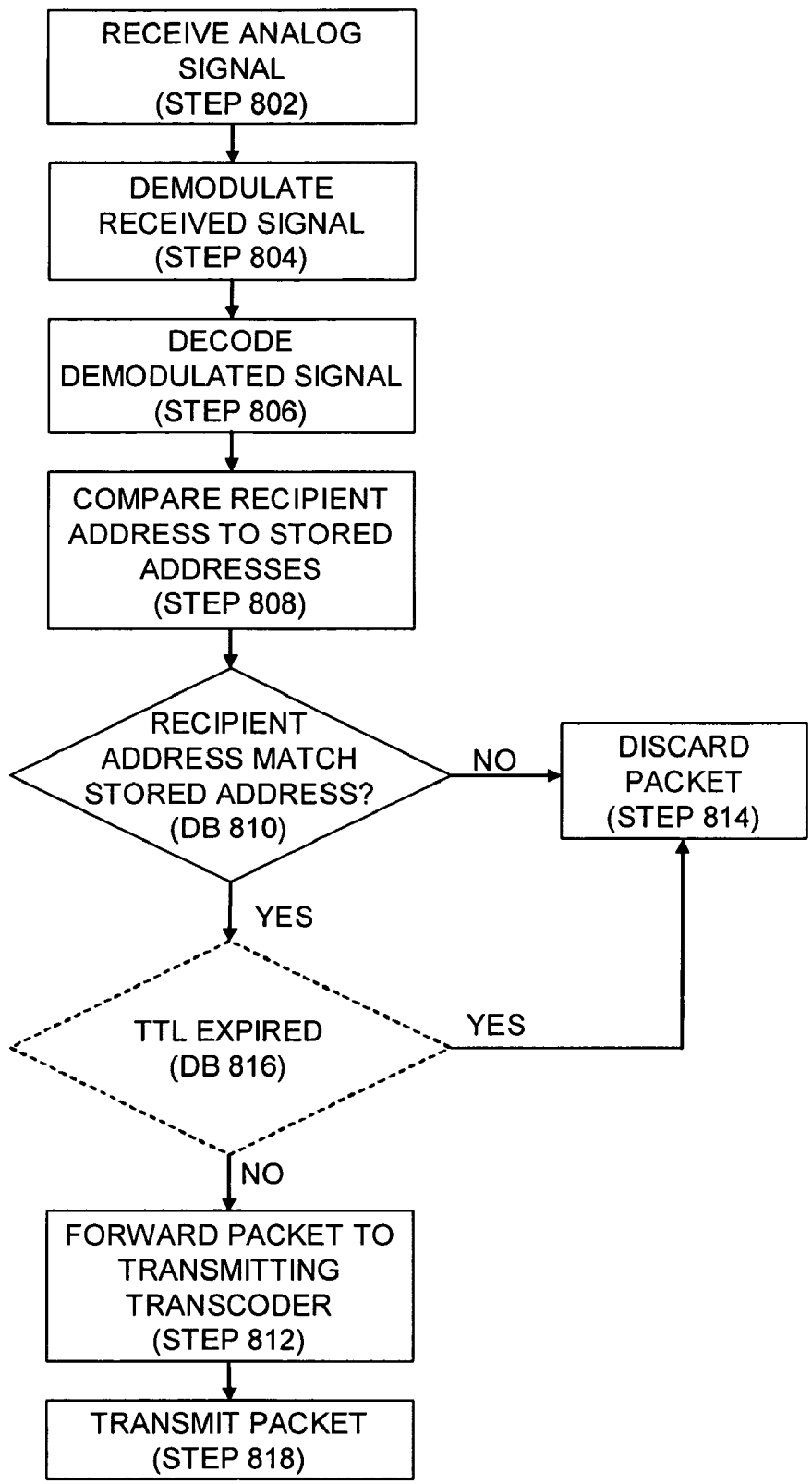
FIG. 8 is a flowchart of a method of forwarding data within a given network used by the repeater of FIG. 7, according to an illustrative embodiment of the invention.

FIG. 8 is a flow chart of an illustrative method 800 of forwarding packets implemented by a repeater 700, according to an illustrative embodiment of the invention. First, the receiving transceiver 706a of the repeater 700 receives an analog signal at the operating frequency of the repeater 700 (step 800). The receiving transceiver 706a demodulates the received signal (step 804) and forwards it to the receiving transcoder 714a. The processor 724a of the receiving transcoder 714a decodes the received signal and extracts a digital data packet (step 806). The processor 724a forwards the digital data packet to the network interface 720a. The network interface 720a of the receiving transcoder 714a compares the address of the intended recipient of the packet, found in the header of the packet, to the addresses stored in its memory 730 (step 808). If the address in the packet matches one of the addresses in the receiving transcoder network interface memory 730 (decision block 810), the network interface 720a outputs the packet via its digital data port 716a to the transmitting transcoder 714b (step 812). If the address in the packet is not in the memory 730 (decision block 810) of the network interface 720a, the network interface 720a discards the packet (step 814). The network interface 720a may optionally discard received data packets (step 814) if the time-to-live field in the packet header is below a predetermined threshold (decision block 816). The transmitting transceiver/transcoder 702b pair, upon receiving the data packet from the receiving transcoder 714a, encodes and retransmits the packet (step 818) as described in relation to FIG. 4, as if it were any other packet.

The repeater 700 of FIG. 7 can be modified to serve as a bridge between multiple networks. For example, the repeater 700 can be modified such that one of the transceiver/transcoder pairs 702a or 702b operates at a first frequency and the other operates at a second frequency. Each pair 702a or 702b is configured to both send and receive data. In such a configuration, all broadcast communications received at one transceiver/transcoder pair 702a or 702b at a first frequency from a first network are retransmitted at a second frequency by the second transceiver/transcoder pair 702a or 702b to communication devices operating on a second network.

Such a bridge may be employed by emergency responders from multiple organizations who respond to a common incident. If either organization utilizes such a bridge, communications transmitted on one network are repeated on the network of the other organization. For example, fire personnel will receive messages transmitted by police personnel, and visa versa, even if their respective communication devices operate on different frequencies.

In another alternative implementation of the repeater 700, the repeater 700 may serve the dual roles of an active communication device and a repeater. In such implementations, the receiving transcoder 714a stores a separate address identifying the speaker 728a of the receiving transcoder 714a. If the dual-role repeater receives a packet addressed to the speaker 728a, instead of or in addition to (for example, if the packet is addressed to a multicast or broadcast address) forwarding the packet to the transmitting transcoder 714b, the packet is forwarded to the vocoder 722a of the receiving transcoder 714a for decoding and output via the speaker 728a.

The dual role repeater can also be formed from a single transceiver/transcoder pair 702. In this implementation, packets received at the transcoder pair are stored in the memory 730a. The stored packets are then forwarded back to the processor 724 for re-encoding and retransmission via the transceiver 706 on which the packet was received.

Figure 9:
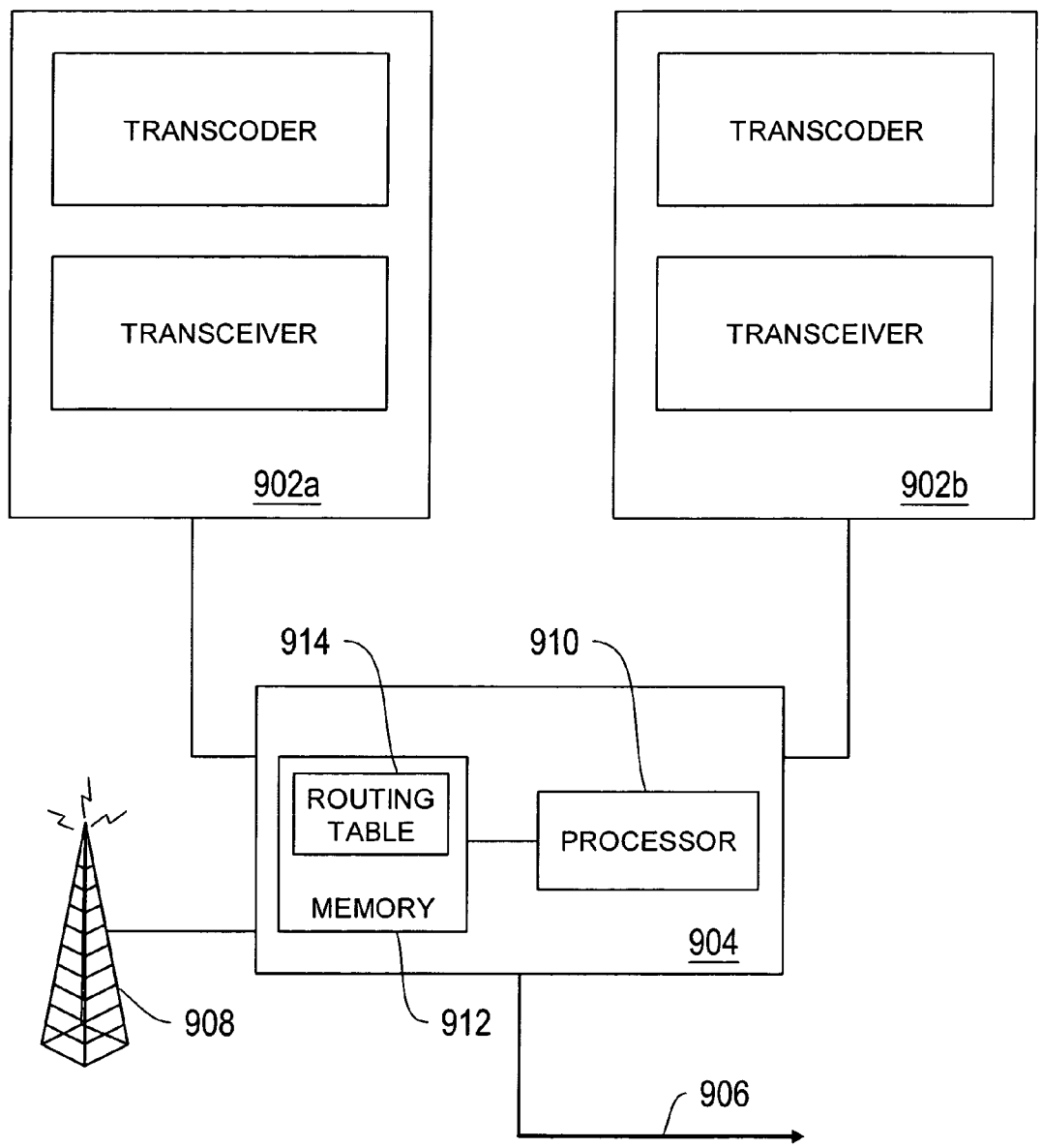
FIG. 9 is a block diagram of a router, according to an illustrative embodiment of the invention.

FIG. 9 is block diagram of a router 900, according to an illustrative embodiment of the invention. The router includes at least two transceiver/transcoder pairs 902a and 902b connected via a computing device 904. The computing device 904 is also optionally connected to a wired network, such as the Internet via wired connection 906, or another wireless network via a cellular, satellite, or other wireless communication device 908. Each of the transceiver/transcoder pairs 902a and 902b operates on a different frequency corresponding to a different network. The computing device 904 includes a processor 910 and a memory 912 storing routing tables 914. The memory can also serve as a message archive as described above in relation to FIG. 7.

Figure 10:
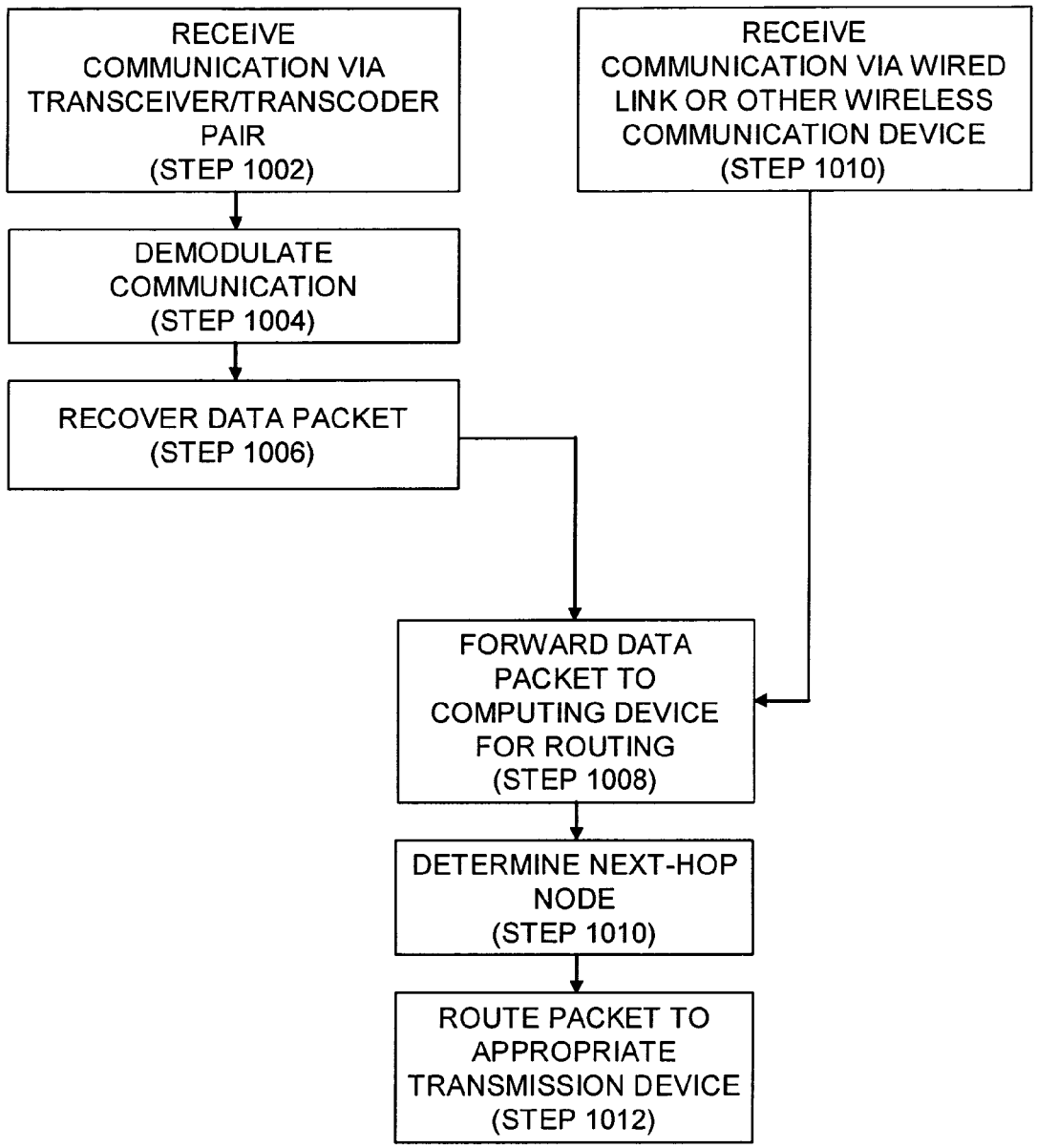
FIG. 10 is a flowchart of a method of routing data among networks using the router of FIG. 9; according to an illustrative embodiment of the invention.

FIG. 10 is a flowchart of a method 1000 of routing packets used by the router 900 of FIG. 9, according to an illustrative embodiment of the invention. The method begins with the router receiving a communication. If the communication is received via one of the transceiver/transcoder pairs 902a or 902b (step 1002), the transceiver/transcoder pair 902a or 902b demodulates the communication (step 1004) and recovers a data packet (step 1006). The receiving transceiver/transcoder pair 902a and 902b forwards the packet to the computing device for routing (step 1008). If the packet is received over the wired connection or the other wireless communication device 908, the packet is forwarded to the computing device for routing.

Using the routing tables, the processor of the computing device determines the next node to forward the packet to advance the packet towards its ultimate destination, referred to as the next-hop node (step 1010). The computing device then forwards the packet to one of the transceiver/transcoder pairs or over the wired or other wireless link for retransmission (step 1012).

In the special case that the packet corresponds to voice data and the next-hop node is a radio complying with the P25 standard, the voice data in the packet is decoded into an analog voice signal for output to the P25 radio to avoid signal loss that might be caused by the vocoder built into the inputs of most P25 devices.

The invention may be embodied in other specific forms without departing form the spirit or essential characteristics thereof. The forgoing embodiments are therefore to be considered in all respects illustrative, rather than limiting of the invention.

What is claimed is:

1. A method of transmitting via a radio comprising:
obtaining data for transmission;
converting the data into first packets having a destination network address;
encoding the first packets in a first plurality of orthogonal frequency division multiplexed (OFDM) tones, wherein the tones of the first plurality of OFDM tones are limited in frequency to a human speech range from about 300 Hz to about 3,000 Hz;
modulating a carrier frequency with the first encoded tones;
transmitting, via a voice grade radio, the modulated carrier frequency as a first Radio Frequency (RF) signal;
receiving, using the voice grade radio, a second plurality of OFDM tones limited in frequency to the human speech range, wherein the voice grade radio comprises a bandpass filter to exclude components of received signals with frequencies outside of the human speech range;
decoding data encoded in the received second plurality of OFDM tones into second packets;
determining a destination address of the decoded second packets;
determining a next-hop node to which to forward the second packets;
re-encoding the second packets into third packets; and
retransmitting the third packets to the next-hop node using a third plurality of OFDM tones limited in frequency to the human speech range, wherein said retransmitting comprises:
encoding the third packets in the third plurality of OFDM tones limited in frequency to the human speech range;
modulating the carrier frequency with the third encoded tones; and
transmitting the modulated carrier frequency as a second RF signal.

2. The method of claim 1, wherein the data comprises voice.

3. The method of claim 2, wherein the data comprises voice over Internet protocol packets.

4. The method of claim 1, comprising outputting the decoded data.

5. The method of claim 1, comprising driving a speaker based on the decoded data.

6. The method of claim 1, wherein encoding the first packets comprises encoding the first plurality of OFDM tones using quadrature amplitude modulation.

7. The method of claim 1, wherein obtaining data for transmission comprises receiving an audio signal via a microphone.

8. The method of claim 1, wherein obtaining data for transmission comprises receiving data at the voice grade radio via a wired communications link with a computer.

9. The method of claim 1, wherein encoding the first packets comprises modulating the first tones according to a quadrature amplitude modulation process.

10. A voice grade radio apparatus comprising:
a housing;
a data input incorporated into the housing for receiving data to transmit;
a voice grade radio interface incorporated in the housing for communicatively coupling the apparatus to a radio via a wire; and
a processor disposed within the housing and in electrical communication with the data and an output configured for:
packetizing the received data into first packets, such that the each resultant packet of the first packets includes a destination network address;
encoding the first packets in a first plurality of orthogonal frequency division multiplexed (OFDM) tones, wherein the tones are limited in frequency to a human speech range from about 300 Hz to about 3,000 Hz;
outputting the encoded first tones via the voice grade radio interface;
decoding data encoded in a received second plurality of OFDM tones into second packets, wherein the received second plurality of OFDM tones is limited in frequency to the human speech range, and wherein the voice grade radio comprises a bandpass filter to exclude components of received signals with frequencies outside of the human speech range;
determining a destination address of the decoded second packets;
determining a next-hop node to which to forward the second packets;
re-encoding the second packets into third packets; and
retransmitting the third packets to the next-hop node using a third plurality of OFDM tones limited in frequency to the human speech range, wherein said retransmitting comprises:
encoding the third packets in the third plurality of OFDM tones limited in frequency to the human speech range; and
outputting the third plurality of OFDM tones via the voice grade radio interface.

11. The apparatus of claim 10, wherein the processor is configured for, in response to determining that the destination network address in one of the decoded packets matches a network address corresponding to the apparatus, outputting data in the decoded packet to a data output incorporated into the housing.

12. The apparatus of claim 11, wherein the data output comprises a speaker.

13. The apparatus of claim 11, wherein the data output comprises a digital data port for communicating the data in the decoded packet over a wire.

14. The apparatus of claim 10 comprising a user interface incorporated into the housing for accepting an identifier corresponding to the destination address.

15. The apparatus of claim 14, wherein the user interface comprises a keypad and a display.

16. The apparatus of claim 10, wherein the data input comprises a microphone.

17. The apparatus of claim 10, comprising a vocoder.

18. The apparatus of claim 10, wherein the data input comprises an Ethernet port.

19. The apparatus of claim 10, comprising a radio having an input port for accepting analog signals having frequencies limited to less than about 3,000 Hz, wherein the radio is communicatively coupled to the housing by a wire connected at one end to the input port of the radio and at the other end to the radio interface incorporated into the housing.

20. The apparatus of claim 10, wherein encoding the data packets comprises modulating the tones according to a quadrature amplitude modulation process.

21. A communications device comprising:
a voice grade FM transceiver comprising a bandpass filter to exclude components of received signals with frequencies outside of a human speech range from about 300 Hz to about 3,000 Hz; and
a processor configured for:
receiving FM transmissions including a first plurality of orthogonal frequency division multiplexed tones modulated on a first carrier frequency, wherein the first tones encode first data packets having a destination address and are limited in frequency to the human speech range from about 300 Hz to about 3,000 Hz;
decoding data encoded in the received first plurality of OFDM tones into the first packets;
determining the destination address of the decoded first packets;
determining a next-hop node to which to forward the first packets;
re-encoding the first packets into second packets; and
retransmitting the second packets to the next-hop node using a second plurality of OFDM tones limited in frequency to the human speech range, wherein said retransmitting comprises:
encoding the second packets in the second plurality of OFDM tones limited in frequency to the human speech range, and
transmitting the second plurality of OFDM tones to the next-hop node.

22. The communications device of claim 21, wherein the processor is configured for:
determining a second carrier frequency corresponding to the destination address;
modulating the second tones on the second carrier frequency; and
broadcasting the second tones modulated on the second carrier frequency.

23. The communication device of claim 21, wherein retransmitting the second packets comprises transmitting the packets over an Ethernet wire.

24. The communication device of claim 21, wherein the first data packets comprise Internet Protocol Packets.

25. The communication device of claim 21, wherein the first data packets comprise Voice Over Internet Protocol Packets.

26. The communication device of claim 21, comprising a routing table for routing packets among nodes in a wireless network.

27. The communication device of claim 21, wherein the first tones encode data packets according to a quadrature amplitude modulation process.

28. The communication device of claim 21 comprising a memory for archiving data packets processed by the processor.

29. The communication device for claim 21 comprising a memory for storing received packets prior to retransmission of the received packets.

30. A wireless local area network comprising:
a plurality of nodes configured for transmitting first digital data packets encoded in a first plurality of orthogonal frequency division multiplexed tones having frequencies limited to a human speech range between about 300 Hz to about 3,000 Hz, wherein the tones are modulated on a first Frequency Modulation (FM) carrier frequency and the first data packets include a destination address; and
a router configured for:
receiving the first plurality of modulated orthogonal frequency division multiplexed (OFDM) tones,
decoding data encoded in the received first plurality of OFDM tones into the first packets,
determining the destination address of the decoded first packets,
determining a next-hop node to which to forward the first packets,
re-encoding the first packets into second packets, and
retransmitting the second data packets to the next-hop node using a second plurality of OFDM tones limited in frequency to the human speech range, wherein said retransmitting comprises:
encoding the second packets in the second plurality of OFDM tones limited in frequency to the human speech range, and
transmitting the second plurality of OFDM tones to the next-hop node.

31. The wireless local area network of claim 30, wherein the router retransmits the second data packets as tones modulated at a second FM carrier frequency.

32. The wireless local area network of claim 30, wherein the router retransmits the second data packets as tones modulated at the first FM carrier frequency.

33. The wireless local area network of claim 30, wherein the router retransmits the second data packets over a wired channel.

34. The wireless local area network of claim 30, wherein the router retransmits the second data packets over an 802.11 link.

35. The wireless local area network of claim 30, wherein the first data packets are encoded in the tones according to a quadrature amplitude modulation process.

* * * * *